US008090196B2

(12) United States Patent
Kojima et al.

(10) Patent No.: US 8,090,196 B2
(45) Date of Patent: Jan. 3, 2012

(54) ALBUM CREATING APPARATUS, ALBUM CREATING METHOD AND COMPUTER READABLE MEDIUM STORING THEREON PROGRAM THEREFOR

(75) Inventors: Kenji Kojima, Tokyo (JP); Akira Yoda, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 1114 days.

(21) Appl. No.: 11/872,446

(22) Filed: Oct. 15, 2007

(65) Prior Publication Data
US 2008/0107331 A1 May 8, 2008

Related U.S. Application Data

(63) Continuation of application No. PCT/JP2006/307998, filed on Apr. 11, 2006.

(30) Foreign Application Priority Data

Apr. 13, 2005 (JP) .................................. 2005-115730
Mar. 14, 2006 (JP) .................................. 2006-069992

(51) Int. Cl.
G06K 9/00 (2006.01)
(52) U.S. Cl. ........ 382/162; 382/224; 382/254; 382/311; 358/1.18
(58) Field of Classification Search .................. 382/162, 382/224, 254, 311; 358/1.18
See application file for complete search history.

(56) References Cited

U.S. PATENT DOCUMENTS

| | | | | |
|---|---|---|---|---|
| 6,952,286 B2 * | 10/2005 | Luo et al. | .................. | 358/1.9 |
| 7,843,581 B2 * | 11/2010 | Hill et al. | ..................... | 358/1.15 |
| 2001/0019427 A1 * | 9/2001 | Komatsu | ..................... | 358/1.18 |
| 2002/0027561 A1 | 3/2002 | Wu | | |
| 2002/0140981 A1 | 10/2002 | Takemoto | | |
| 2003/0021468 A1 | 1/2003 | Jia et al. | | |
| 2005/0093989 A1 * | 5/2005 | Imai | .......................... | 348/222.1 |
| 2005/0228785 A1 * | 10/2005 | Wolcott et al. | .................... | 707/3 |

FOREIGN PATENT DOCUMENTS

| | | | |
|---|---|---|---|
| EP | 1274228 A | 1/2003 |
| JP | 9138846 A | 5/1997 |
| JP | 10126731 A | 5/1998 |
| JP | 2002158870 A | 5/2002 |
| JP | 2003023646 A | 1/2003 |

* cited by examiner

Primary Examiner — Vikkram Bali
Assistant Examiner — Eueng-Nan Yeh
(74) Attorney, Agent, or Firm — Sughrue Mion, PLLC

(57) ABSTRACT

To easily create an album with colors visually harmonized with images. An album creating apparatus includes: a main subject determining section for determining the main subject of an image; a color extraction section for extracting a plurality of colors included in an image region other than the main subject determined by the main subject determining section; an appearance frequency of color calculating section for calculating the appearance frequency of the plurality of colors extracted by the color extraction section; a characteristic color determining section for determining the characteristic color in the image region other then the main subject determined by the main subject determining section based on the appearance frequency of the plurality of colors calculated by the appearance frequency of color calculating section; and an album color selecting section for selecting a color used for the album which is used in the region other than the image in the album including images.

14 Claims, 11 Drawing Sheets

PRIOR ART

282

| COLOR OF COLOR PALLET | HUE | LIGHTNESS | SATURATION | IMAGE REGION |
|---|---|---|---|---|
| SKY BLUE | BLUE | >50 | >15 | TOP HALF |
| WINE RED | RED | >30 | <15 | LOWER REGION OF FACE |
| PEARL WHITE | — | >70 | <10 | WHOLE REGIONS |
| ⋮ | ⋮ | ⋮ | ⋮ | ⋮ |

*FIG. 6*

ALBUM CREATING APPARATUS, ALBUM CREATING METHOD AND COMPUTER READABLE MEDIUM STORING THEREON PROGRAM THEREFOR

CROSS REFERENCE TO RELATED APPLICATION

This is a continuation application of PCT/JP2006/307998 filed on Apr. 11, 2006 which claims priority from Japanese Patent Applications Nos. 2005-115730 filed on Apr. 13, 2005 and 2006-069992 filed on Mar. 14, 2006, the contents of which are incorporated herein by reference.

BACKGROUND

1. Technical Field

The present application claims priority from Japanese Patent Applications Nos. 2005-115730 filed in JP on Apr. 13, 2005 and 2006-069992 filed in JP on Mar. 14, 2006, the contents of which are incorporated herein by reference if applicable.

The present invention relates to an album creating apparatus, an album creating method, and a program. Particularly, the present invention relates to an album creating apparatus and an album creating method for creating an album including a plurality of images, and a program for the album creating apparatus.

2. Related Art

Conventionally, a technology for creating an album has been known that the map of travel destination is disposed at the center of a screen, images are disposed around the map based on tag information such as position information and image-capturing time information associated with image data captured in traveling, and the images and the image-capturing positions on the map are connected by lines, so that the relationship between the map and the images can be identified, for example as disclosed in Japanese Patent Application Publication No. 10-126731.

However, when an album is created by the above disclosed technology, an album in which images captured by the sea, such as the beach, the ocean and the sky are disposed around the map with mostly black may be created. The pale color of the beach, the ocean and the sky is not visually harmonized with the black color of the map, so that the viewer of the album feels uncomfortable. It is preferred that the color of the title of the album, objects in the album, such as illustration and the frames used to enhance the images are harmonized with the colors of images stored in the album. Additionally, it is preferred that the viewer can easily create the album with the harmonized colors and view the same without the complicated work such as determining colors used in the album.

SUMMARY

Thus, it is an object of some aspects of the present invention to provide an album creating apparatus, an album creating method and a computer readable medium storing thereon a program which are capable of solving the problem accompanying the conventional art. The above and other objects can be achieved by combining the features recited in independent claims. Then, dependent claims define further effective specific example of the present invention.

To solve the above-described problem, a first aspect of the present invention provides an album creating apparatus for creating an album including images. The album creating apparatus includes: a main subject determining section for determining the main subject of an image; an image color analyzing section for analyzing the color of the image region other than the main subject determined by the main subject determining section; and an album color determining section for determining a color used for the region other than images in the album including the images.

The image color analyzing section includes a color extraction section for extracting a plurality of colors included in the image region other than the main subject determined by the main subject determining section and an appearance frequency of color calculating section for calculating the appearance frequency of the plurality of colors extracted by the color extraction section. The album color determining section includes a characteristic color determining section for determining the characteristic color of the image region other than the main subject determined by the main subject determining section and an album color selecting section for selecting colors used in the region other than images in the album including the images.

The album color determining section further includes a color palette information storage section for storing plural pieces of information on a color pallet indicative of a plurality of predetermined color combinations. The album color selecting section selects the color pallet including the characteristic color determined by the characteristic color determining section and uses colors included in the selected color pallet as the colors used for the album.

The characteristic color determining section determines a plurality of characteristic colors in the image region other than the main subject determined by the main subject determining section based on the appearance frequency of the plurality of colors calculated by the appearance frequency of color calculating section. The album color selecting section selects the color pallet including the plurality of characteristic colors determined by the characteristic color determining section and selects the colors included in the selected color pallet as the colors used for the album.

The album color determining section further includes an average appearance frequency information storage section for previously storing the average appearance frequency indicative of the average frequency at which each of the plurality of colors can appear in the image in association with each of the plurality of colors. The characteristic color determining section determines that a color of which ratio of the appearance frequency calculated by the appearance frequency of color calculating section to the average appearance frequency stored in the average appearance frequency information storage section is larger is the characteristic color of the image region other than the main subject determined by the main subject determining section.

The album creating apparatus further includes an image-capturing position identifying section for identifying the position at which the image is captured. The color pallet information storage section stores plural pieces of information on the color pallet indicative of a plurality of predetermined color combinations in association with the image-capturing position. The album color selecting section selects a plurality of color pallets stored in the color pallet information storage section in association with the image-capturing position identified by the image-capturing position identifying section, selects the color pallet including the characteristic color determined by the characteristic color determining section and selects the colors included in the selected color pallet as the colors used for the album.

The album crating apparatus further includes an image storage section for storing a plurality of images and a main image selecting section for selecting a main image in the album among the plurality of images stored in the image storage section. The color extraction section extracts a plurality of colors included in the image region other than the main subject determined by the main subject determining section in the main image selected by the main image selecting section. The appearance frequency of color calculating section calculates the appearance frequency of the plurality of colors extracted by the color extraction section. The characteristic color determining section determines the characteristic color in the image region other than the main subject determined by the main subject determining section based on the appearance frequency of the plurality of colors calculated by the appearance frequency of color calculating section.

The album creating apparatus further includes a sub-image selecting section for selecting a sub-image subordinate to the main image selected by the main image selecting section in the album from the plurality of images stored in the image storage section based on the characteristic color determined by the characteristic color determining section.

The color extraction section extracts a plurality of colors included in the image region other than the main subject determined by the main subject determining section in the plurality of images stored in the image storage section. The characteristic color determining section determines the characteristic color in the image region other than the main subject determined by the main subject determining section based on the appearance frequency of the plurality of colors calculated by the appearance frequency of color calculating section. The sub-image selecting section selects the color pallet including the characteristic color determined by the characteristic color determining section in the main image selected by the main image selecting section and selects as a sub-image the image including the colors included in the selected color pallet as the characteristic color determined by the characteristic color determining section.

The album color determining section further includes a color pallet information storage section for storing plural pieces of information on the color pallet indicative of a plurality of predetermined color combinations and a color pallet selecting section for selecting a color pallet including the characteristic color determined by the characteristic color determining section. The album color selecting section may extract a similar color most similar to at least one of colors included in the color pallet selected by the color pallet selecting section and select the extracted color as the color used for the album.

The album color determining section further includes an extraction condition storage section for storing a condition to extract the color as a similar color in association with each color included in the color pallet stored in the color pallet information storage section. The album color selecting section may extract the color conformed to the extraction condition stored in the extraction condition storage section in association with each color included in the color pallet selected by the color pallet selecting section as the similar color among the plurality of colors extracted by the color extraction section and select the extracted similar color as the color used for the album.

The extraction condition storage section stores a color range from which the similar colors including each color in the color pallet stored in the color pallet information storage section should be extracted as in association with each of the colors. The album color selecting section may extract the color within the color range stored in the extraction condition storage section in association with each color in the color pallet selected by the color pallet selecting section as the similar color among the plurality of colors extracted by the color extraction section and select the extracted similar color as the color used for the album.

The album creating apparatus further includes a texture extraction section for extracting the amount of characteristic of texture from an object which is included in the image and has the characteristic color determined by the characteristic color determining section and an album creating section for laying out a texture template image generated based on the amount of characteristic of the texture extracted by the texture extraction section into the region other than images in the album including the images.

A second aspect of the present invention provides an album creating method for creating an album including images. The album creating method includes the steps of: determining the main subject of an image; analyzing the color of the image region other than the main subject determined in the main subject determining step; and determining a color used for the region other than images in the album including the images based on the result of analysis in the image color analyzing step.

A third aspect of the present invention provides a computer readable medium storing thereon a program for an album creating apparatus for creating an album including images. The program operates the album creating apparatus to function as: a main subject determining section for determining the main subject of an image; an image color analyzing section for analyzing the color of the image region other than the main subject determined by the main subject determining section; and an album color determining section for determining a color used for the region other than images in the album including the images.

A fourth aspect of the present invention provides an album creating apparatus for creating an album including images. The album creating apparatus includes: a main subject determining section for determining the main subject of an image; a texture extraction section for extracting the amount of characteristic of the texture included in the image region other than the main subject determined by the main subject determining section; and an album creating section for laying out a texture template image generated based on the amount of characteristic of the texture extracted by the texture extraction section in the region other than images in the album including the images.

The texture extraction section extracts the characteristic frequency domain in the image region other than the main subject by analyzing spatial frequency in the image region other than the main subject determined by the main subject determining section. The album creating section may lay out the texture template image generated by enhancing the frequency domain extracted by the texture extraction section into the region other than images in the album including the images.

The album creating apparatus further includes a template storage section for storing a background template in which the design of the region other than images in the album including the images is defined. The album creating section may generate a luminance signal pattern in which the frequency domain extracted by the texture extraction section is enhanced and superimpose the generated luminance signal pattern on the background template stored in the template storage section to generate a texture template image, and may further lay out the generated texture template image into the region other than images in the album including the images.

The album creating apparatus further includes a texture template storage section for storing the texture template image having the amount of characteristic of the texture in association the amount of characteristic thereof. The album creating section may lay out the texture template image stored in the texture template storage section in association with the amount of characteristic of the texture extracted by the texture extraction section into the region other than images in the album including the images.

A fifth aspect of the present invention provides an album creating method for creating an album including images. The album crating method includes the steps of: determining the main subject of an image; extracting the amount of characteristic of texture included in the image region other than the main subject determined in the main subject determining step; and laying out a texture template image generated based on the amount of characteristic of the texture extracted in the texture extracting step into the region other than images in the album including the images.

A sixth aspect of the present invention provides a computer readable medium storing thereon a program for an album creating apparatus for creating an album including images. The program operates the album creating apparatus to function as: a main subject determining section for determining the main subject of an image; a texture extraction section for extracting the amount of characteristic of the texture included in the image region other than the main subject determined by the main subject determining section; and an album creating section for laying out a texture template image generated based on the amount of characteristic of the texture extracted by the texture extraction section in the region other than images in the album including the images.

Here, all necessary features of some of the embodiments of the present invention described above are not listed in the summary clause. The sub-combinations of the features may become the invention.

As described above, an album with colors visually harmonized with images can be easily created.

BRIEF DESCRIPTION OF THE DRAWINGS

FIG. 6 is a table showing an example of the extraction condition;

DESCRIPTION OF THE EXEMPLARY EMBODIMENTS

Hereinafter, some aspects of the present invention will now be described through preferred embodiments. The embodiments do not limit the invention according to claims and all combinations of the features described in the embodiments are not necessarily essential to means for solving the problems accompanying the conventional art.

Figure 1:
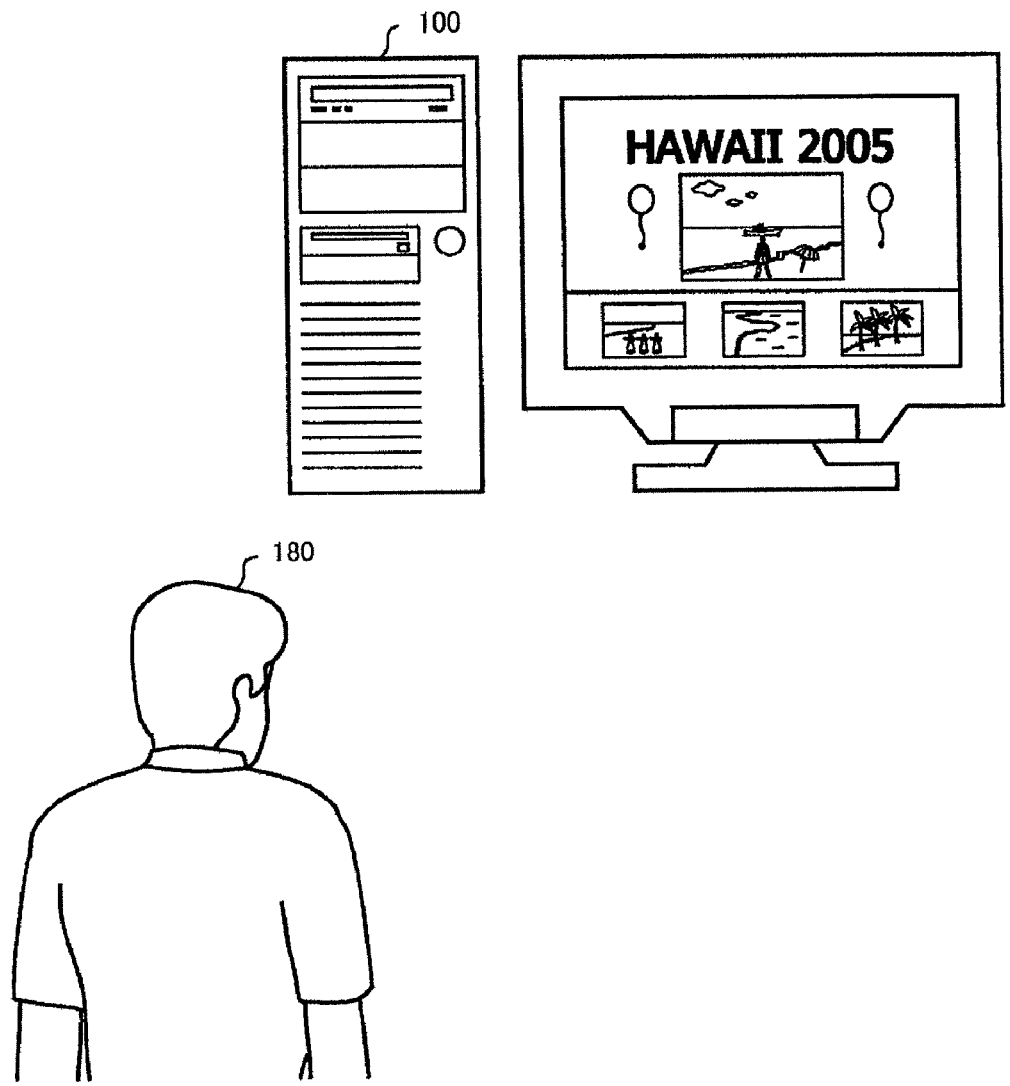
FIG. 1 shows an example of the environment for the usage of an album creating apparatus 100.

FIG. 1 shows an example of the environment for the usage of an album creating apparatus 100 according to an embodiment of the present invention. The album creating apparatus 100 creates an album by a plurality of images and causes an output device such as a display and a printer to output the album. The album creating apparatus 100 extracts the characteristic color included in the image region other than the main subject, such as the background of a subject person. For example, the album creating apparatus 100 extracts white and light blue as the color which most frequently appears in the image region for the beach, the ocean and the sky as the background of the main subject person captured in Hawaii. Then, the album creating apparatus 100 selects a color pallet including the extracted color among a plurality of color pallets prepared for the album of the trip to Hawaii. Then, the album creating apparatus 100 colors the titles of the album, each frame of images and objects with the colors included in the selected color pallet to create an album. Here, the album creating apparatus 100 may be an apparatus for creating an album and printing the same. For example, the album creating apparatus 100 may be a personal computer, an electronic album, a HDTV and a printer.

As described above, the album creating apparatus 100 can automatically create an album with colors harmonized with the colors included in the environmental color surrounding the main subject. Therefore, a user 180 can easily create an album without visually uncomfortable feeling.

Figure 2:
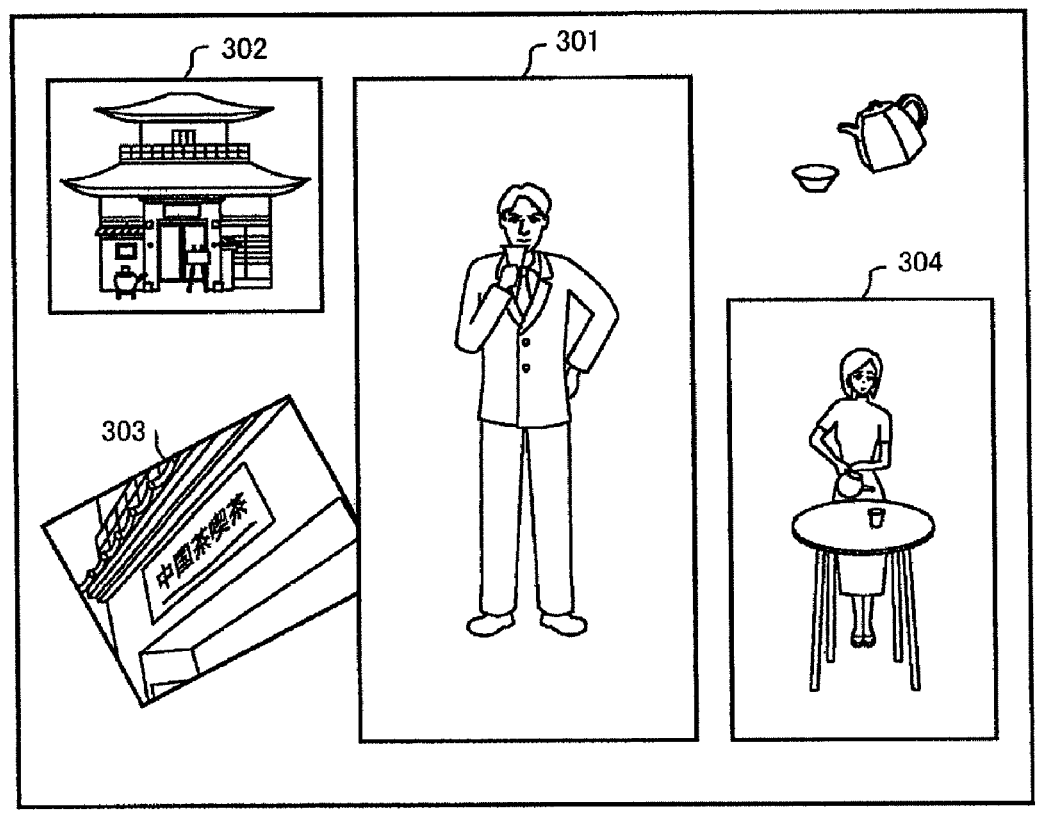
FIG. 2 shows an example of a main image and sub images in an album.

FIG. 2 shows an example of a main image and sub images in an album. The main subject in the present embodiment is an image aimed to make an impression to the viewer in the page. For example, the main image may be the most enhanced image among a plurality of images laid out in the page. Specifically, the main image may be an image of which size is larger than the other images, which is laid out in more front than the other images and which is laid out more centrally than the other images. Additionally, the main image may be an image of which outline is enhanced by the frame and in which visual effect is given on the subject. Meanwhile, the sib-image of the present embodiment may be an image of which size is smaller than the main image and which is laid out more outwardly than the main image. For example in FIG. 2, an image 301 is the main image and images 302, 303 and 304 are sub-images.

The album creating apparatus 100 has a plurality of templates in which image frames into which the images are fitted in the page, and may create the album by fitting the images into the image frames indicated in the template. Additionally, the image frame into which the main image should be fitted and the image frames into which the sub-images should be fitted may be previously defined in the template. Then, the album creating apparatus 100 selects images having colors visually harmonized with the characteristic color of the main image as the characteristic color thereof and fits the same into the image frames for the sub-images.

Here, the page of the present embodiment may be a facing page in the album or may be one side of the facing page. Additionally, when the album creating apparatus 100 is an apparatus for outputting the album on a display device, the page is may be a display region in which a plurality of images are simultaneously displayed on the display device.

Figure 3:
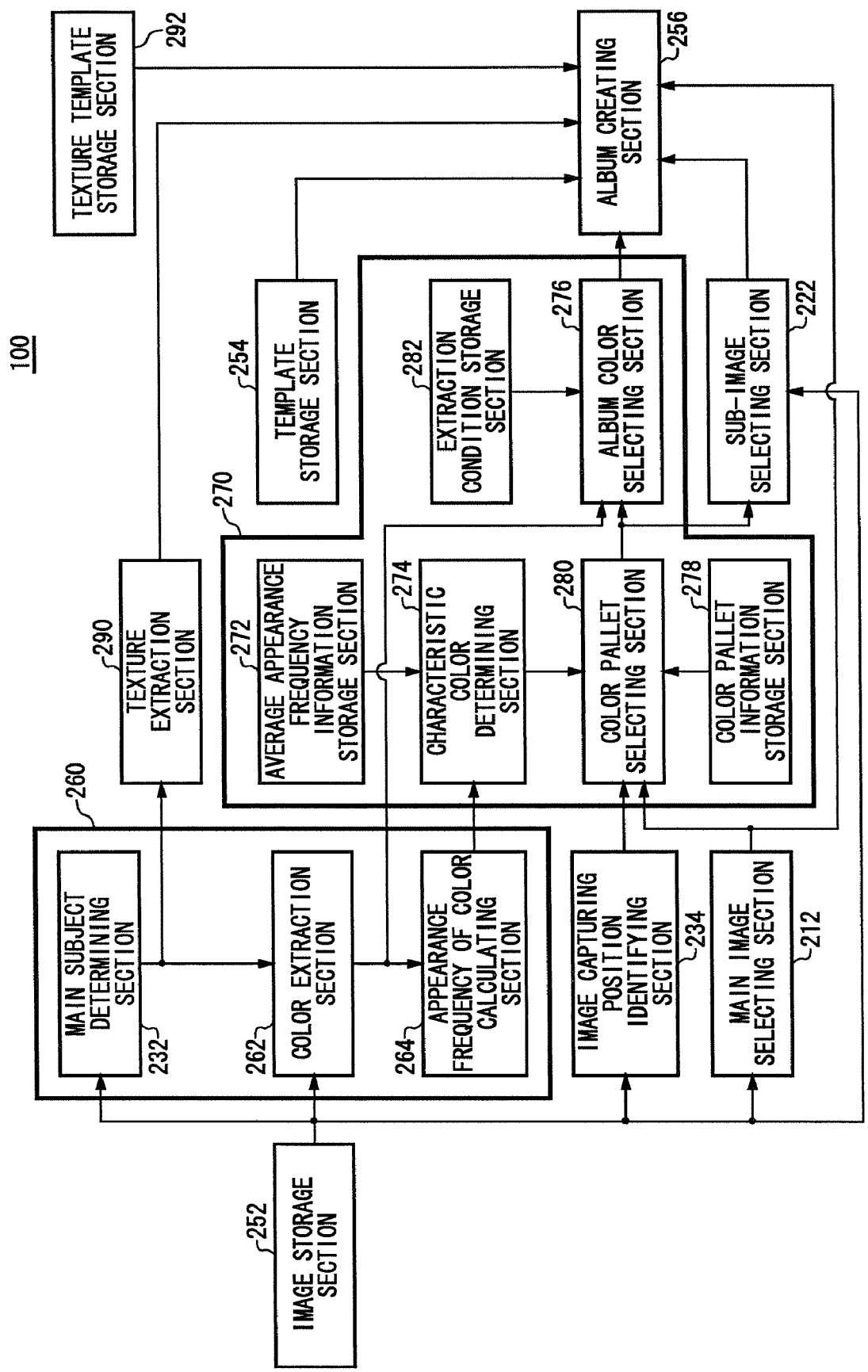
FIG. 3 is an example of a block configuration of the album creating apparatus 100.

FIG. 3 is an example of a block configuration of the album creating apparatus 100. The album creating apparatus 100 includes an image storage section 252, a main image selecting section 212, a sub-image selecting section 222, an image-capturing position identifying section 234, an image color analyzing section 260, an album color determining section 270, a template storage section 254, a texture extraction section 290, a texture template storage section 292 and an album creating section 256. The image color analyzing section 260 has a main subject determining section 232, a color extraction section 262 and an appearance frequency of color calculating section 264. The album color determining section 270 has a characteristic color determining section 274, an album color selecting section 276, a color pallet information storage section 278, an average appearance frequency information storage section 272, a color pallet selecting section 280 and an extraction condition storage section 282.

The image storage section 252 stores a plurality of images. The main subject determining section 232 determines the main subject of the image. Specifically, the image storage section 252 stores a plurality of images used to create an album. Then, the main subject determining section 232 determines the main subject for each of the plurality of images used to create the album, which are stored in the image storage section 252. The main image selecting section 212 selects the main image in the album among the plurality of images stored in the image storage section 252.

The image color analyzing section 260 analyzes the color of the image region other than the main subject determined by the main subject determining section 232. The template storage section 254 stores a template indicative of a predetermined layout of the album. For example, template storage section 254 stores the size and the position of the image laid out in each page and stores colored regions such as a region for the title of the album, a region for the background of the image in the album and a region for the frame of the image.

The album color determining section 270 determines colors used for the region other than images in the album including the images based on the result of analysis of the image color analyzing section 260. Then, the album creating section 256 colors the colored region indicated in the template stored in the template storage section 254 using the color determined by the album color determining section 270. Then, the album creating section 256 lays out the plurality of images stored in the image storage section 252 based on the template stored in the template storage section 254 to create the album.

The color extraction section 262 extracts a plurality of colors included in the image region other than the main subject determined by the main subject determining section 232. The appearance frequency of color calculating section 264 calculates the appearance frequency of the plurality of colors extracted by the color extraction section 262. Here, the appearance frequency may be based on the area for each color in the image. Additionally, when the image storage section 252 stores the color for each pixel, the color extraction section 262 may extract the color for each pixel, and the appearance frequency of color calculating section 264 may calculate based on the total number of pixels of the color extracted by the color extraction section 262.

The average appearance frequency information storage section 272 previously stores the average appearance frequency at which each of the plurality of colors can appear in the image. The characteristic color determining section 274 determines the characteristic color in the image region other than the main subject determined by the main subject determining section 232 based on the appearance frequency of the plurality of colors calculated by the color appearance calculating section 264. Here, the color extraction section 262 may extract the plurality of colors included in the image region other than the main subject determined by the main subject determining section 232 in the main image selected by the main image selecting section 212.

Specifically, the characteristic color determining section 274 determines that a color of which ratio of the appearance frequency calculated by the appearance frequency of color calculating section to the average appearance frequency stored in the average appearance frequency information storage section 272 is larger is the characteristic color of the image region other than the main subject determined by the main subject determining section 232. Therefore, if purple is included in the image against a background of the landscape of nature, the characteristic color determining section 274 determines that the purple is the characteristic color because there is little purple in nature. Thereby a color which can attract the attention of the viewer can be determined as the characteristic color.

The color pallet information storage section 278 stores plural pieces of information on the color pallet indicative of a plurality of predetermined combinations of colors. Here, the color pallet information storage section 278 stores plural pieces of information on the color pallet indicative of a plurality of predetermined color combinations in association with the image-capturing position. Here, the color pallet may be a plurality of color combinations which are visually harmonized with each other. Additionally, the color pallet information storage section 278 may include a color pallet acquired by means of a communication line such as Internet, and also may include a color pallet recorded on a recording medium such as a semiconductor memory.

The image-capturing position identifying section 234 identifies the image-capturing position at which image included in the album is captured. Specifically, the image storage section 252 stores the latitude and longitude of the image-capturing position as tag information of the image. The image-capturing position identifying section 234 identifies a region including the image capturing position of the image included in the album with reference to the tag information of the image. For example, the image-capturing position identifying section 234 identifies the country including the image-capturing position of the image included in the album.

The color pallet selecting section 280 selects the color pallet including the characteristic color determined by the characteristic color determining section 274 from the color pallet information storage section 278. Here, the color pallet selecting section 280 may select a plurality of color pallets stored in the color pallet information storage section 278 in association with the image-capturing position identified by the image-capturing position identifying section 234. For example, the color pallet selecting section 280 may select the plurality of color pallets stored in the color pallet information storage section 278 in association with the region identified by the image-capturing position identifying section 234. Additionally, the color pallet selecting section 280 selects the color pallet including the characteristic color determined by the characteristic color determining section 274 in the main image selected by the main image selecting section 212 from the color pallet information storage section 278.

The album color selecting section 276 selects colors used for the album which are used for the region other than images in the album including the images based on the characteristic color determined by the characteristic color determining section 274. Specifically, the album color selecting section 276 selects the color pallet including the characteristic color determined by the characteristic color determining section 274 and selects the color included in the selected color pallet as the colors used for the album. More specifically, the album color selecting section 276 selects the colors included in the color pallet selected by the color pallet selecting section 280 as the colors used for the album.

Here, the album color selecting section 276 may select a plurality of color pallets stored in the color pallet information storage section in association with the image-capturing position identified by the image-capturing position identifying section 234. Then, the album color selecting section 276 selects the color pallet including the characteristic color determined by the characteristic color determining section 274 from the plurality of selected color pallets and selects the colors included in the selected color pallet as the colors used for the album. Therefore, the page including images captured in China can be colored using the color pallet for China, which includes red of Chinese flag. Accordingly, the album can be created without uncomfortable feeling by the user 180.

The sub-image selecting section 222 selects the sub-image subordinate to the main image selected by the main image selecting section 212 in the album from the plurality of images stored in the image storage section 252 based on the characteristic color determined by the characteristic color determining section 274. Specifically, the color extraction section 262 extracts a plurality of colors included in the image region other than the main subject determined by the main subject determining section 232 in the plurality of images stored in the image storage section 252. The characteristic color determining section 274 determines the characteristic color in the image region other than the main subject determined by the main subject determining section 232 based on the appearance frequency of the plurality of colors calculated by the appearance frequency of color calculating section 264. Then, the sub-image selecting section 222 selects the color pallet including the characteristic color determined by the characteristic color determining section 274 in the main image selected by the main image selecting section 212 and selects as the sub-image the image including the colors in the selected color pallet as the characteristic color determined by the characteristic color determining section 274. More specifically, the sub-image selecting section 222 selects as the sub-image the image including the colors in the color pallet selected by the color pallet selecting section 280 as the characteristic color determined by the characteristic color determining section 274.

Therefore, the image including the colors in the color pallet including the characteristic color of the main image as the characteristic color can be laid out in one page, so that the album including the images, which is visually harmonized can be created.

Here, the characteristic color determining section 274 may determine a plurality of characteristic colors in the image region other than the main subject determined by the main subject determining section 232 based on the appearance frequency of the plurality of colors calculated by the appearance frequency of color calculating section 264. Then, the album color selecting section 276 may select the color pallet including the plurality of characteristic colors determined by the characteristic color determining section 274 and select the colors included in the selected color pallet as the colors used for the album.

The color pallet selecting section 280 selects the color pallet including the characteristic color determined by the characteristic color determining section 274. Then, the album color selecting section 276 extracts the similar color which is most similar to at least one color included in the color pallet selected by the color pallet selecting section 280 among the plurality of colors extracted by the color extraction section 262, and selects the extracted similar color as the color used for the album.

The extraction condition storage section 282 stores an extraction condition to extract the similar color in association with each of the colors included in the color pallet stored in the color pallet information storage section 278. Then, the album color selecting section 276 extracts the color conformed to the extraction condition stored in the extraction condition storage section 282 in association with each of the colors included in the color pallet selected by the color pallet selecting section 280 and selects the extracted similar color as the color used for the album.

The extraction condition storage section 282 stores a color range from which the similar colors including each color in the color pallet stored in the color pallet information storage section 278 should be extracted as in association with each of the colors. Then, the album color selecting section 276 extracts the colors within the color range stored in the extraction condition storage section 282 in association with each of the colors included in the color pallet selected by the color pallet selecting section 280 as the similar color among the plurality of colors extracted by the color extraction section 262, and selects the extracted similar color as the color used for the album. Therefore, the album creating apparatus 100 can arrange the colors which are actually included in the image and close to the color pallet in the album.

The texture extraction section 290 extracts the amount of characteristic of the texture included in the image region other than the main subject determined by the main subject determining section 232. Then, the album creating section 256 lays out a texture template image generated based on the amount of characteristic of the texture extracted by the texture extraction section 290 into the region other than images in the album including the images.

Specifically, the texture extraction section 290 extracts the characteristic frequency domain in the image region other than the main subject by analyzing the spatial frequency in the image region other than the main subject determined by the main subject determining section 232. Then, the album creating section 256 lays out the texture template image generated by enhancing the frequency domain extracted by the texture extraction section 290 into the region other than images in the album including the images.

Specifically, the texture template storage section 292 stores the texture template image having the amount of characteristic of the texture in association with the amount of characteristic of the texture. Then, the album creating section 256 lays out the texture template image stored in the texture template storage section 292 in association with the amount of characteristic of the texture extracted by the texture extraction section 290 into the region other than the images in the album including the images.

Here, the template storage section 254 stores a background template in which the design of the region other than the images in the album including the images is defined. Then, the album creating section 256 generates a luminance signal pattern in which the frequency domain extracted by the texture extraction section 290 is enhanced and superimposes the generated luminance signal pattern on the background template stored in the template storage section to generate a texture template image, and may further lay out the generated texture template image into the region other than images in the album including the images.

Here, the texture extraction section 290 extracts the amount of characteristic of the texture from the object which is included in the image and has the characteristic color determined by the characteristic color determining section 274. The album creating section 256 lays out the texture template image generated based on the amount of characteristic of the texture extracted by the texture extraction section 290 into the region other than the images in the album including the images. Therefore, the album creating apparatus 100 can enhance the texture in the characteristic region in the image in designing the album.

As described above, the album creating apparatus can create the album with the colors visually harmonized with the background of the main subject of the image in the album. For example, when the album is created using the image in which the beach, the ocean and the sky are mainly shown as the background of the subject, the album creating apparatus 100 automatically create the album using the color pallet including pale colors harmonized with the image, such as white and pale blue. Additionally, even if the person as the main subject wearing the white clothes being not visually harmonized with the color of the landscape is shown on the image, the album creating apparatus 100 can create the album with the color harmonized with the color of the landscape. Therefore, the album creating apparatus 100 can provide the album to the user 180 without feeling uncomfortable.

Figure 4:
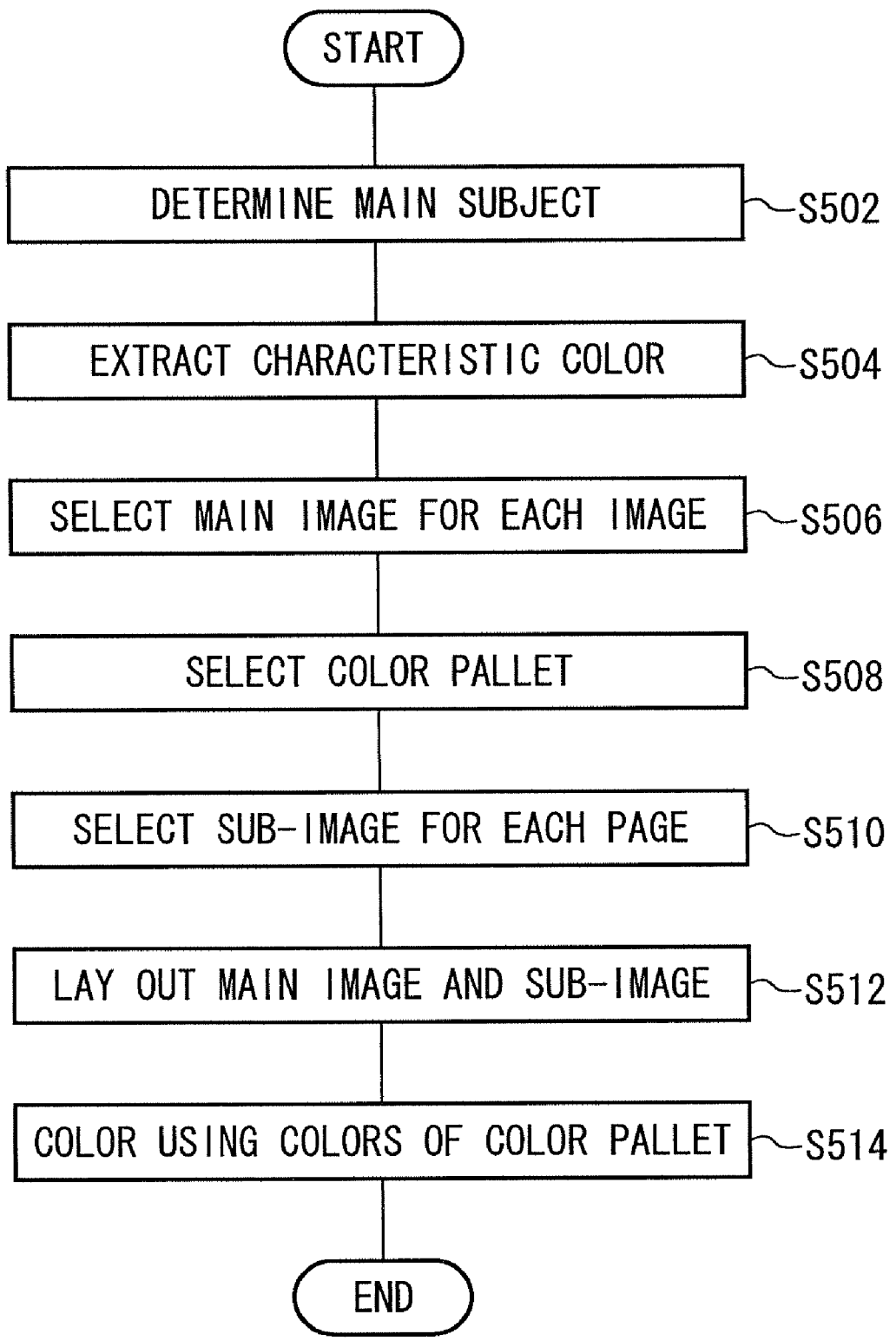
FIG. 4 is an example of a flowchart showing the album creation.

FIG. 4 is an example of a flowchart showing the album creation. The main subject determining section 232 determines the main subject for each of the plurality of images in the album (S502). At this time, the main subject determining section 232 may determine that a partial region with higher contrast is the partial region in which the main subject is included among a plurality of partial regions in the image, and also may determine the main subject by edge-extracting the outline of the subject in the partial region. Additionally, the main subject determining section 232 may preferentially select the subject of which area is larger in the image as the main subject. Additionally, the main subject determining section 232 may preferentially select the subject of which operating quantity is larger as the main subject.

Then, the characteristic color determining section 274 extracts the characteristic color of the image region other than the main subject for each image (S504). Then, the main image selecting section 212 may select the main image for each page among the images divided into each page in the album (S506). Additionally, the main image may select by the user 180.

Then, the color pallet selecting section 280 selects the color pallet including the characteristic color of the main image among one or more color pallets stored in the color pallet information storage section 278 in association with the image-capturing position of the image identified by the image-capturing position identifying section 234 (S508). Then, the sub-image selecting section 222 selects as the sub-image the image including the color in the pallet selected in the S508 as the characteristic color (S510).

Then, the album creating section 256 fits the main image and the sub-image into the image frames indicated in the template in each page of the album and lays out the same (S512). Then, the album creating section 256 colors the colored region indicated in the template using the colors included in the template selected in the S508 (s514), and ends the processing. Therefore, the album creating apparatus 100 can create the album visually harmonized for each page of the album.

Here, in the S508, the color pallet selecting section 280 may select the color pallet including a plurality of characteristic colors determined in the main image for each page of the album. Then, the album color selecting section 276 may select the color used for the album for each page among the colors included in the color pallet selected by the color pallet selecting section 280. Thereby the album which is visually harmonized in total can be created. Additionally, when the image for each page is determined in the S508, the color pallet selecting section 280 may select the color pallet including the plurality of characteristic colors determined for each of the main image and the sub-image stored in each page of the album.

Figure 5:
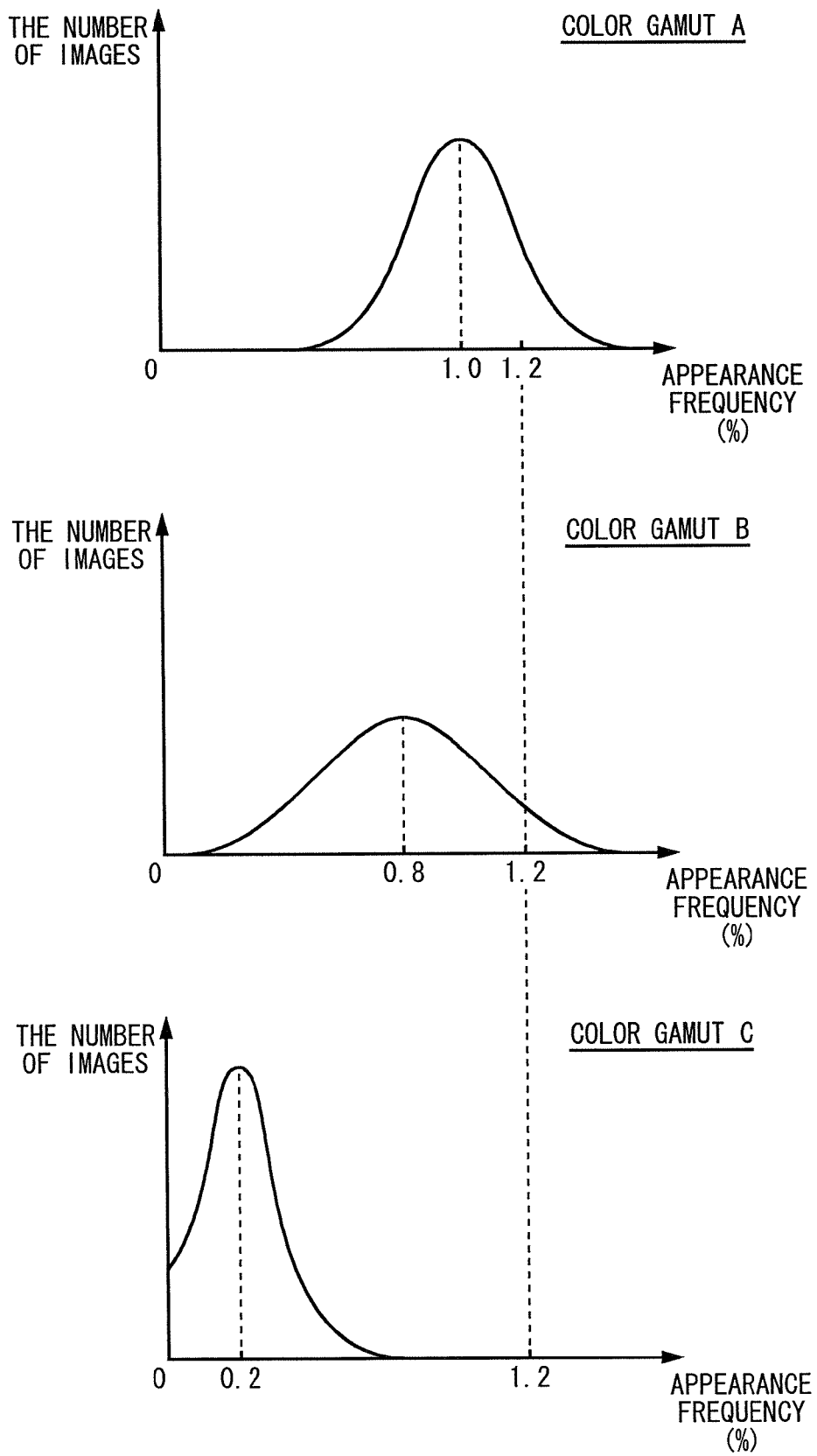
FIG. 5 shows an example of appearance frequency of colors in the image.

FIG. 5 shows an example of appearance frequency of colors in the image. FIG. 5 shows, for each of a plurality of color gamut (color gamut A, color gamut B and color gamut C) obtained by dividing a color space into a plurality of regions, the distribution of the number of images with respect to the appearance frequency at which the color included in each color gamut appears in the image. Here, the appearance frequency may be a value obtained by dividing the area of the color for each color gamut in the image by the total area of the image. Additionally, the distribution of the number of images may be previously determined or may be derived from the plurality of images captured by the user 180.

Then, the average appearance frequency information storage section 272 stores the average appearance frequency in the distribution of the number of images. For example in FIG. 5, the average appearance frequency information storage section 272 stores 1%, 0.8% and 0.2% for each of the average appearance frequency of the color gamut A, the color gamut B and the color gamut C, respectively. Then, if the appearance frequency of color calculating section 264 calculates the appearance frequency of the color gamut A, the color gamut B and the color gamut C is 1.2%, the characteristic color determining section 274 determines the characteristic color based on the ratio between the average appearance frequency and the frequency ratio (color gamut A: 1.2, color gamut B: 1.5 and color gamut C: 6). In this case, the characteristic color determining section 274 determines the color included in the color gamut C of which ratio of the appearance frequency to the average appearance frequency is larger is the characteristic color.

Then, the color pallet selecting section 280 selects the color pallet including the characteristic color determined by the characteristic color determining section 274. Here, the characteristic color determining section 274 may determine the characteristic color from the colors included in each of the plurality of color gamut of which appearance frequency is higher. Then, the color pallet selecting section 280 may select the color pallet including the plurality of characteristic colors determined by the characteristic color determining section 274.

Additionally, the characteristic color determining section 274 may select the color of which ratio of the appearance frequency to the average appearance frequency is larger as the characteristic color having larger amount of characteristic in the plurality of images Here, the average appearance frequency information storage section 272 may store nothing other than the distribution of the number of images. Then, the characteristic color determining section 274 may calculate the deviation value of the color calculated by the color appearance calculating section 264 based on the distribution stored in the average appearance frequency information storage section 272 and determine the color with higher deviation value as the characteristic color. Additionally, the characteristic color determining section 274 may determine the color with higher deviation value as the characteristic color having higher amount of characteristic.

Therefore, even if the appearance frequency of purple is smaller than that of the other colors in the purple parasol is shown as the background of a person in the large beach, the purple can be used as the characteristic color of the image in the album provided that the average appearance frequency of the purple is less than that of the other colors. Therefore, the album creating apparatus 100 can create the album using the characteristic color of the image.

FIG. 6 is a table showing an example of the extraction condition stored in the extraction condition storage section 282. The extraction condition storage section 282 stores the extraction condition regarding hue, lightness, saturation and the image region in association with the colors included in the color pallet. Here, the hue, the lightness and the saturation indicate the color extraction condition to define the color range, and the image region indicates the positional extraction condition to define the range within which the color should be placed in the image. The template color selecting section 276 replaces the colors includes in the color pallet with the colors conformed to the extraction condition stored in the extraction condition storage section 282 among the colors extracted by the color extraction section 262.

For example, the extraction condition storage section 282 stores an extraction condition that colors of which hue is blue, of which index of lightness is more than 50 and of which index of saturation is more than 15 can be extracted as the color which can be replaced with sky blue. Additionally, the extraction condition storage section 282 stores an extraction condition that the colors placed in top half of the image can be extracted as the colors which can be replaced with sky blue. Then, the template color selecting section 276 replaces the sky blue with the color satisfying the above-described color extraction condition among the colors extracted by the color extraction section 262. Thus, the template color selecting section 276 can replace the colors included in the color pallet with the colors which are close to the colors in the color pallet and actually included in the image. Therefore, the album creating apparatus 100 can create the album with the color arrangement more harmonized with the image.

Here, when there are plurality of colors conformed to the extraction condition stored in the extraction condition storage section 282 among the colors extracted by the color extraction section 262, the template color selecting section 276 may preferentially select more similar color among the plurality of colors. Here, the more similar color may be a color which is different less from the color in the color pallet. Additionally, the template color selecting section 276 may preferentially select a color of which appearance frequency calculated by the appearance frequency of color calculating section 264 is higher among the plurality of colors. Further, the template color selecting section 276 may preferentially select a color of which ratio of the appearance frequency to the average appearance frequency stored in the average appearance frequency information storage section 272 among the plurality of colors.

The template color selecting section 276 may replace a color near white light such as pearl white with the light source color in the image. Additionally, the template color selecting section 276 may extract a color of which luminance value is more than the predetermined value and of which saturation is less than the predetermined saturation as the light source color. Then, the template color selecting section 276 may replace the color near the white light included in the color pallet with the color extracted as the light source color. Here, the extraction condition storage section 282 can store the condition such luminance value and saturation in association with the white color included in the color pallet, of course.

Figure 7:
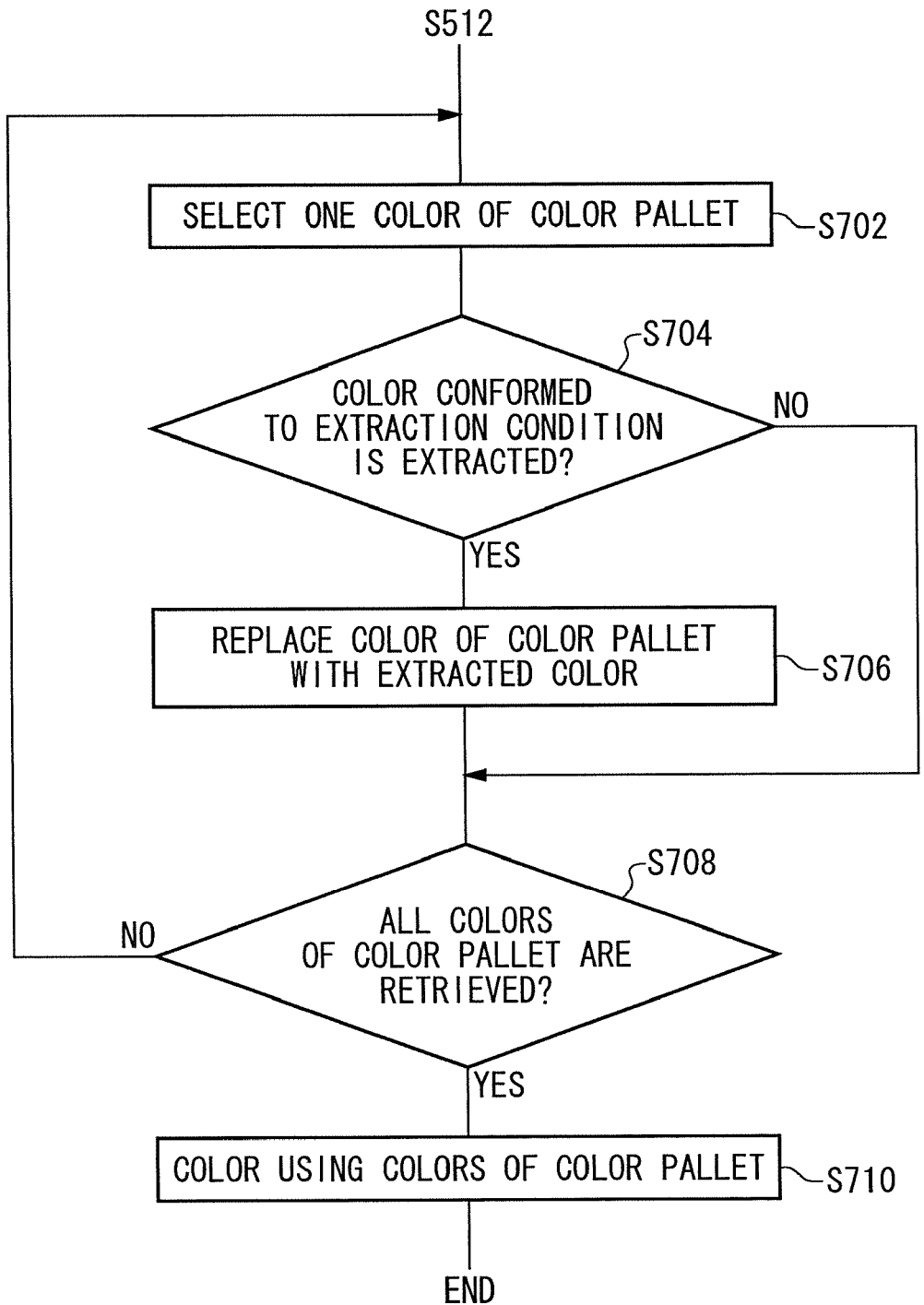
FIG. 7 is an example of flowchart showing the operation to replace colors in a color pallet.

FIG. 7 is an example of flowchart showing the operation to replace colors in a color pallet. The flowchart specifically represents an example of the operation to replace particularly the colors of the color pallet in the processing of the S514 of FIG. 4. The template color selecting section 276 selects one color from the color pallet selected in the S508 (S702). Then, the template color selecting section 276 determines whether the color conformed to the extraction condition stored in the extraction condition storage section 282 in association with the selected color is extracted by the color extraction section 262 (S704). When it is determined that the color conformed to the extraction condition is extracted in the S704, the color selected in the S702 is replaced with the color conformed to the extraction condition (S706). Then, the template color selecting section 276 determines whether all the colors included in the color pallet are selected in the S702, and the color conformed to the extraction condition is retrieved (S708). When it is determined that all the colors in the color pallets are retrieved in the S708, the colored region indicated in the color pallet is colored using the replaced color in the color pallet (S710), and then, the processing is ended.

When it is determined that any color conformed to the extraction condition is not extracted in the S704, the template color selecting section 276 shifts the processing to the S708. Additionally, it is determined that all the colors in the color pallet are not retrieved in the S708, the template color selecting section 276 shifts the processing to the S702, selects a new color for the color conformed to the extraction condition which has not been retrieved from the color pallet and sifts the processing following the S704.

Figure 8:
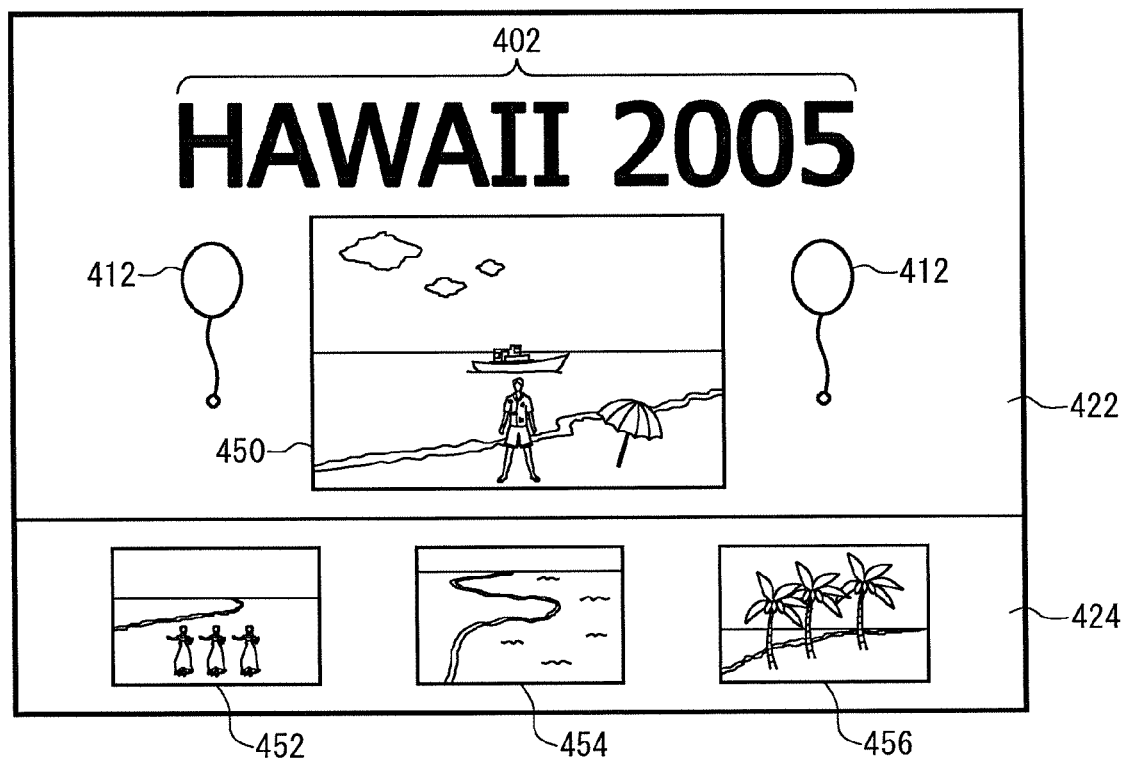
FIG. 8 shows an example of one page of the created album.

FIG. 8 shows an example of one page of the album created by the album creating apparatus 100. For example in FIG. 8, the template storage section 254 stores layout information on a colored region 402 for the title of the page, a colored region 412 for an object such as an illustration and colored regions 422 and 424 for the background. Additionally, the template storage section 254 stores composition information on image frames 450, 452, 454 and 456 indicative of the position and the size of the image. Then, the album creating section 256 fits the main image selected by the main image selecting section 212 into the image frame 450. Then, the album creating section 256 fits the images selected by the sub-image selecting section 222 into the image frames 452, 454 and 456. Then, the album creating section 256 colors each of the colored region 402 using the color selected by the album color selecting section 276.

Here, the album creating section 256 may color the colored region 422 having larger area in the colored regions using the color having the hue, the lightness and the saturation close to those of the characteristic color determined by the characteristic color determining section 274 among the colors used for the album. Additionally, the album creating section 156 may color the colored region 422 having larger area among the colored regions using the color having the hue, the lightness and the saturation close to those of the characteristic color with larger amount of the characteristic. Further, the album creating section 256 may color the colored region 402 for the title using the color having the saturation higher than that of the other colored regions among the colors used for the album selected by the album color selecting section 276.

Additionally, the album creating section 256 may select the characteristic color of which amount of characteristic is larger and of which average appearance frequency is smaller among the characteristic colors determined by the characteristic color determining section 274, select the color having the hue, the lightness and the saturation close to those of the selected characteristic color among the colors used for the album and use the same. For example, when a purple parasol is shown in the image and the characteristic color determining section 274 determines that the purple of the parasol is the characteristic color, the album creating section 256 selects a color close to the purple of the parasol among the colors used for the album and colors the colored region 412. Thereby the album creating section 256 can create the album with the colors harmonized with the image and the colors making an impression on the user 180.

As described above, the album creating apparatus 100 can create an album using colors visually harmonized with the image stored in the album. For example, when the album is created using the image having the background in which the beach, the ocean and the sky are mainly shown, the album creating apparatus 100 automatically create the album using the color pallet including pale color such as white and light blue. Therefore, the user 180 can easily create the album without visually feeling uncomfortable.

Figure 9:
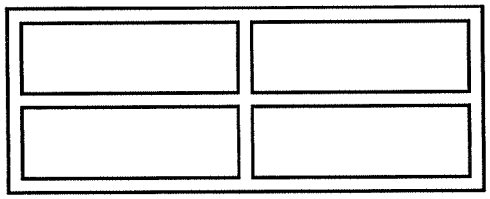
FIG. 9 shows an example of a texture template.

FIG. 9 shows an example of a texture template stored in the texture template storage section 292. The texture template storage section 292 stores the texture template in association with the characteristic frequency. Here, the characteristic frequency may be the frequency from which the high intensity is calculated when the luminance value of the image in the texture template is Fourier analyzed in the x-direction and the y-direction. The texture template storage section 292 may store a plurality of characteristic frequencies in each of the x-direction and the y-direction.

The texture extraction section 290 calculates the characteristic frequency from the image in the image region other than the main subject by Fourier analyzing. Then, the album creating section 256 compares the characteristic frequency stored in the texture template storage section 292 with the characteristic frequency extracted by the texture extraction section 290 and selects the texture template stored in the texture template storage section 292 in association with the characteristic frequency having higher conformance. Then, the album creating section 256 creates the album using the selected texture template. Here, the conformance may be derived based on the difference between the characteristic frequency extracted by the texture extraction section 290 and the characteristic frequency stored in the texture template storage section 292. Here, when the difference (or total value of the difference) is less, it is determined that the conformance is higher.

The texture template storage section 292 may store nothing other than the intensity distribution of the frequency obtained by analyzing the frequency of the template such as Fourier analysis. Additionally, the texture template storage section 292 may store the texture template in association with an edge pattern obtained by an edge extraction from the texture template. Then, the texture extraction section 290 may extract the edge pattern extracted by the edge extraction from the image in the image region other than the main subject as a texture. Then, the album creating section 256 compares the edge pattern extracted by the texture extraction section 290 with the edge pattern stored in the texture template storage section 292 by pattern-matching and selects the edge pattern having the maximum conformance. Then, the album creating section 256 may select the texture template stored in the texture template storage section 292 in association with the selected edge pattern and create the album using the selected texture template.

Figure 10:
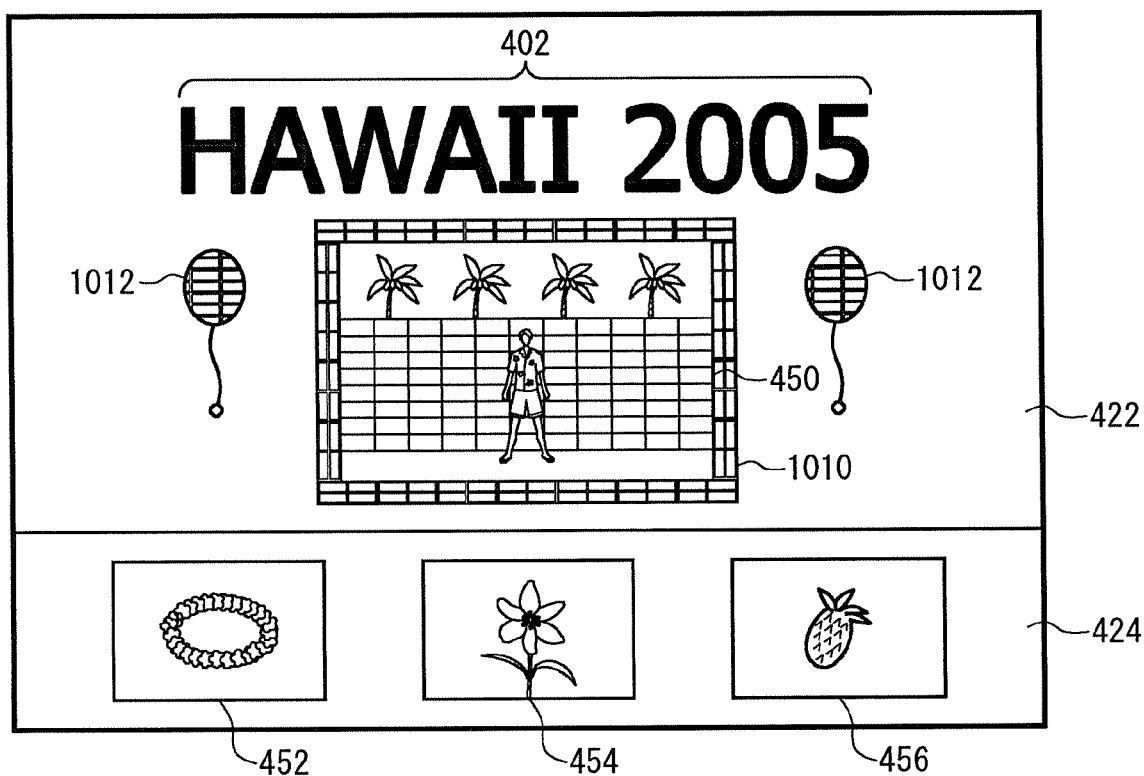
FIG. 10 shows an example of the layout result in one page of the album.

FIG. 10 shows an example of the layout result in one page of the album created by the album creating section 256. The album creating section 256 forms an image frame 450 using the texture template (frame 1010). Additionally, the album creating section 256 performs an image processing on the colored region 412 indicative of a balloon to enhance the texture extracted by the texture extraction section 290.

Specifically, the album creating section 256 performs inverse Fourier transform on the intensity distribution including the characteristic frequency extracted by the texture extraction section 290 to generate an luminance pattern having the enhanced frequency. Then, the album creating section 256 superimposes the generated luminance pattern on the luminance data of the colored region 412 to generate the texture template of which characteristic frequency is enhanced in the colored region 412. Additionally, the album creating section 256 may generate the texture template from the characteristic frequency extracted by the texture extraction section 290 from the object having the characteristic color determined by the characteristic color determining section 274. Further, the album creating section 256 performs inverse Fourier transform on the frequency distribution in which the intensity of the characteristic frequency extracted by the texture extraction section 290 is larger than that of the other frequency in the frequency distribution obtained by spatially Fourier transforming the luminance value of the colored region 412 to generate the texture template of which characteristic frequency is enhanced.

As described above, the album creating apparatus 100 can create the album in which the texture similar to the texture surrounding the main subject is enhanced. Therefore, the album creating apparatus 100 can provide the album with the visually balanced images for the viewer.

Figure 11:
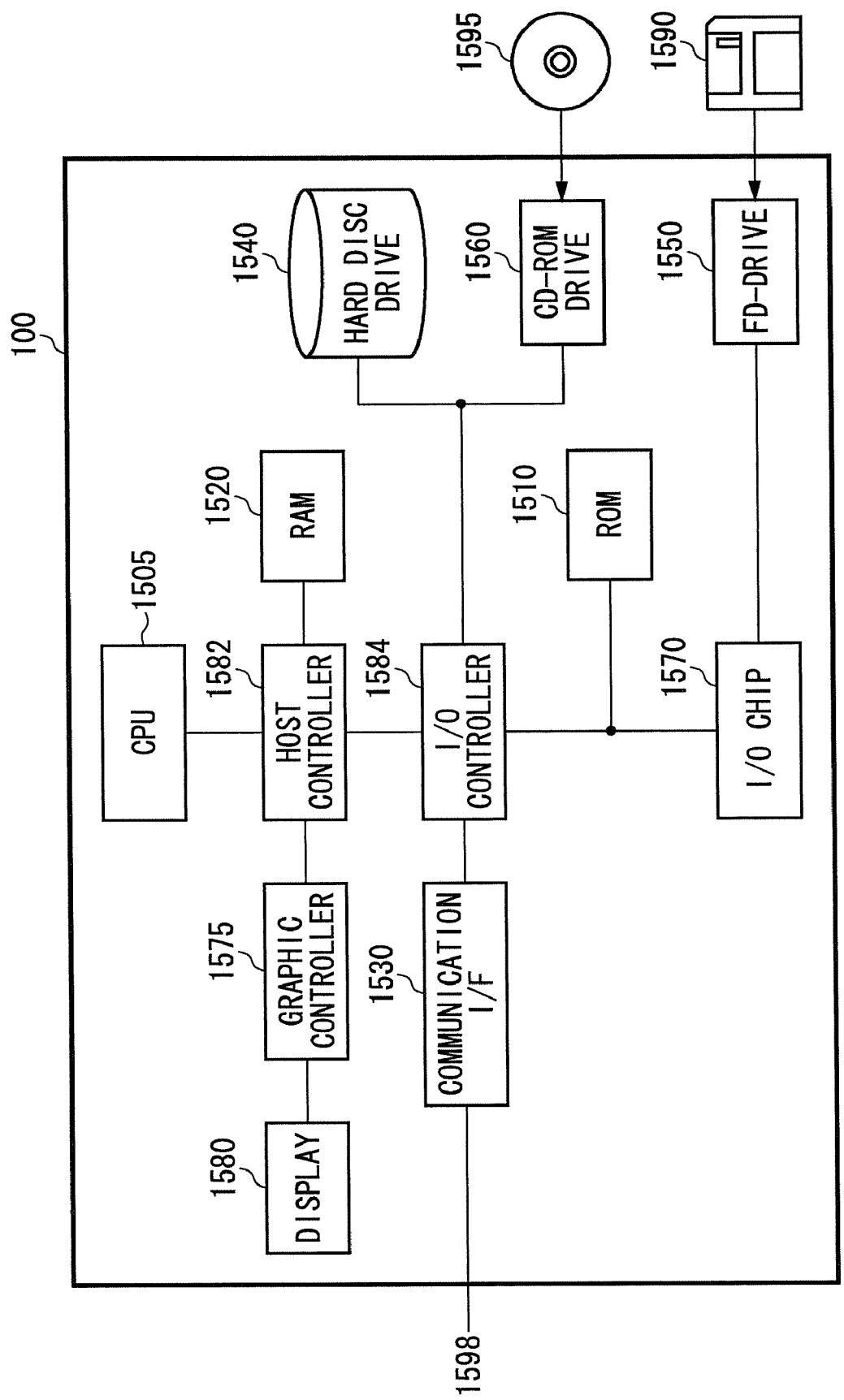
FIG. 11 shows an example of the hardware configuration of the image creating apparatus 100.

FIG. 11 shows an example of the hardware configuration of the album creating apparatus 100 according to the present embodiment. The album creating apparatus 100 includes a CPU periphery having a CPU 1505, a RAM 1520, a graphic controller 1575 and a display 1580 which are connected through a host controller 1582 each other, an input/output unit having a communication interface 1530, a hard disk drive 1540 and a CD-ROM drive 1560 which are connected to the host controller 1582 through an input/output controller 1584 and a legacy input/output unit having a ROM 1510, a flexible disk drive 1550 and an input/output chip 1570 which are connected to the input/output controller 1584.

The host controller 1582 connects the RAM 1520 to the CPU 1505 and the graphic controller 1575 which access the RAM 1520 with a high transfer rate. The CPU 1505 operates according to the programs stored in the ROM 1510 and the RAM 1520 to control each unit. The graphic controller 1575 obtains image data generated on a frame buffer provided in the RAM 1520 by the CPU 1505 and displays the same on the display 1580. Alternatively, the graphic controller 1575 may include therein a frame buffer for storing image data generated by the CPU 1505.

The input/output controller 1584 connects the host controller 1582 to the hard disk drive 1540, the communication interface 1530 and the CD-ROM drive 1560 which are relatively high-speed input/output units. The hard disk drive 1540 stores the program and data used by the CPU 1505. The communication interface 1530 connects to a network communication device 1598 and transmits/receives the program or data. The CD-ROM drive 1560 reads the program or data from the CD-ROM 1595 and provides the same to the hard disk drive 1540 and the communication interface 1530 through the RAM 1520.

The ROM 1510, and the flexible disk drive 1550 and input/output chip 1570 which are relatively low-speed input/output units are connected to the input/output controller 1584. The ROM 1510 stores a boot program executed by the album creating apparatus 100 at activating and a program depending on the hardware of the album creating apparatus 100. The flexible disk drive 1550 reads the program or data from a flexible disk 1590 and provides the same to the hard disk drive 1540 and the communication interface 1530 through the RAM 1520. The input/output chip 1570 connects various input/output units through the flexible disk drive 1550 and such as a parallel port, a serial port, a keyboard port and a mouse port.

The program executed by the CPU 1505 is stored in a recording medium, such as the flexible disk 1590, the CD-ROM 1595, or an IC card and provided by the user. The program stored in the recording medium may be compressed or not compressed. The program is installed from the recording medium to the hard disk drive 1540, read by the RAM 1520 and executed by the CPU 1505.

The program executed by the CPU 1505 operates the album creating apparatus 100 to function as the image storage section 252, the main image selecting section 212, the sub-image selecting section 222, the image-capturing position identifying section 234, the image color analyzing section 260, the album color determining section 270, the template storage section 254, the texture extraction section 290, the texture template storage section 292 and the album creating section 256 which are described with reference to FIG. 1-6. Additionally, the program executed by the CPU 1505 operates the image color analyzing section 260 to function as the main subject determining section 232, the color extraction section 262 and the appearance frequency of color calculating section 264. Further, the program executed by the CPU 1505 operates the album color determining section 270 to function as the characteristic color determining section 274, the album color selecting section 276, the color pallet information storage section 278 and the average appearance frequency information storage section 272, the color pallet selecting section 280 and the extraction condition storage section 282.

The above-described programs may be stored in an external storage medium. The external recording medium may be, in addition to the flexible disk 1590 and the CD-ROM 1595, an optical storage medium such as a DVD and a PD, a magneto-optical recording medium such as a MD, a tape medium and a semiconductor memory such as an IC card. A storage medium such as a hard disk or a RAM which is provided in the server system connected to a private communication network or Internet is used as the recording medium to provide the program to the album creating apparatus 100 through the network.

While some embodiments of the present invention have been described with the embodiment, the technical scope of the embodiment of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

The invention claimed is:

1. An album creating apparatus for creating an album including an image, comprising:
 a processor programmed to control:
  a main subject determining section for determining a main subject of the image;
  an image color analyzing section for analyzing a color in an image region other than the main subject determined by the main subject determining section; and
  an album color determining section for determining colors used for a region other than the image in the album including the image based on the result of analysis of the image color analyzing section,
 wherein the image color analyzing section includes:
  a color extraction section for extracting a plurality of colors included in the image region other than the main subject determined by the main subject determining section; and
  an appearance frequency of color calculating section for calculating the appearance frequency of the plurality of colors extracted by the color extraction section, and
 wherein the album color determining section includes:
  a characteristic color determining section for determining a characteristic color in the image region other than the main subject determined by the main subject determining section based on the appearance frequency of the plurality of colors calculated by the color appearance calculating section; and
  an album color selecting section for selecting a color used for the album which is used in the region other than the image in the album including the image based on the characteristic color determined by the characteristic color determining section.

2. The album creating apparatus according to claim 1 further comprising a color pallet information storage section for storing plural pieces of information on a color pallet indicative of a plurality of predetermined color combinations, wherein
 the album color selecting section selects the color pallet including the characteristic color determined by the characteristic color determining section and selects the color included in the selected color pallet as a color used for the album.

3. The album creating apparatus according to claim 2, wherein
 the characteristic color determining section determines a plurality of characteristic colors in the image region other than the main subject determined by the main subject determining section based on the appearance frequency of the plurality of colors calculated by the appearance frequency of color calculating section, and
 the album color selecting section selects the color pallet including the plurality of characteristic colors determined by the characteristic color determining section and selects the color included in the selected color pallet as the color used for the album.

4. The album creating apparatus according to claim 2 further comprising an image-capturing position identifying section for identifying a position at which the image is captured, wherein
 the color pallet information storage section stores information on the color pallet indicative of a plurality of predetermined color combinations in association with the image-capturing position, and
 the album color selecting section selects a plurality of color pallets stored in the color pallet information storage section in association with the image-capturing position identified by the image-capturing position identifying section, selects the color pallet including the characteristic color determined by the characteristic color determining section from the plurality of selected color pallets and selects the color included in the selected color pallet as the color used for the album.

5. The album creating apparatus according to claim 1, wherein the album color determining section further including:
 an average appearance frequency information storage section for previously storing an average appearance frequency indicative of the average frequency at which each of the plurality of colors can appear in the image in association with each of the plurality of colors, wherein the characteristic color determining section determines that a color of which ratio of the appearance frequency calculated by the appearance frequency of color calculating section to the average appearance frequency stored in the average frequency appearance information storage section is larger is the characteristic color in the image region other than the main subject determined by the main subject determining section.

6. The album creating apparatus according to claim 2 further comprising:

an image storage section for storing a plurality of images; and a main image selecting section for selecting a main image in the album among the plurality of images stored in the image storage section, wherein the color extraction section extracts a plurality of colors included in the image region other than the main subject determined by the main subject determining section in the main image selected by the main image selecting section, the appearance frequency of color calculating section calculates the appearance frequency of the plurality of colors extracted by the color extraction section in the main image selected by the main image selecting section, and the characteristic color determining section determines a characteristic color in the image region other than the main subject determined by the main subject determining section based on the appearance frequency of the plurality of colors calculated by the appearance frequency of color calculating section in the main image selected by the main image selecting section.

7. The album creating apparatus according to claim 6 further comprising a sub-image selecting section for selecting a sub-image to be subordinate to the main image selected by the main image selecting section in the album among the plurality of images stored in the image storage section based on the characteristic color determined by the characteristic color determining section.

8. The album creating apparatus according to claim 7, wherein the color extraction section extracts a plurality of colors included in the image region other than the main subject determined by the main subject determining section in the plurality of images stored in the image storage section, the characteristic color determining section determines the characteristic color in the image region other than the main subject determined by the main subject determining section based on the appearance frequency of the plurality of colors calculated by the appearance frequency of color calculating section, and the sub-image selecting section selects the color pallet including the characteristic color determined by the characteristic color determining section in the main image selected by the main image selecting section and selects as a sub-image the image including the color included in the selected color pallet as the characteristic color determined by the characteristic color determining section.

9. The album creating apparatus according to claim 1, wherein the album color determining section further including:

a color pallet information storage section for storing plural pieces of information on the color pallet indicative of a plurality of predetermined color combinations; and a color pallet selecting section for selecting the color pallet including the characteristic color determined by the characteristic color determining section, and wherein the album color selecting section extracts a similar color most similar to at least one of colors included in the color pallet selected by the color pallet selecting section and selects the extracted similar color as the color used for the album.

10. The album creating apparatus according to claim 9, wherein the album color determining section further including:

an extraction condition storage section for storing an extraction condition to extract as the similar color in association with each of the colors included in the color pallet stored in the color pallet information storage section, wherein the album color selecting section extracts as the similar color the color conformed to the extraction condition stored in the extraction condition storage section in association with each of the colors included in the color pallet selected by the color pallet selecting section among the plurality of colors extracted by the color extraction section and selects the extracted similar color as the color used for the album.

11. The album creating apparatus according to claim 10, wherein the extraction condition storage section stores a color range from which the similar colors including the colors in the color pallets are extracted in association with each of the colors in the color pallet stored in the color pallet information storage section, and the album color selecting section extracts as the similar color the color included in the color range stored in the extraction condition storage section in association with each of the colors in the color pallet selected by the color pallet selecting section among the plurality of colors extracted by the color extraction section and selects the extracted similar color as the color used for the album.

12. The album creating apparatus according to claim 1 further comprising:

a texture extraction section for extracting the amount of characteristic of texture from an object which is included in the image and has the characteristic color determined by the characteristic color determining section; and an album creating section for laying out a texture template image generated based on the amount of characteristic of the texture extracted by the texture extraction section into the region other than the image in the album including the album.

13. An album creating method for creating an album including an image, comprising:

determining a main subject of the image;

analyzing a color in an image region other than the main subject determined in the main subject determining step; and determining a color used for a region other than the image in the album including the image based on the result of analysis of the image color analyzing step, wherein the color analyzing step includes:

extracting a plurality of colors included in the image region other than the main subject determined by the main subject determining section, and calculating the appearance frequency of the plurality of colors extracted by the color extraction section, and wherein the color determining step includes:
- determining a characteristic color in the image region other than the main subject determined by the main subject determining section based on the appearance frequency of the plurality of colors calculated by the color appearance calculating section, and
- selecting a color used for the album which is used in the region other than the image in the album including the image based on the characteristic color determined by the characteristic color determining section.

14. A non-transitory computer readable medium storing thereon a program for an album creating apparatus for creating an album including an image, the program operates the album creating apparatus to function as:
- a main subject determining section for determining a main subject of the image;
- an image color analyzing section for analyzing a color in an image region other than the main subject determined by the main subject determining section; and
- an album color determining section for determining colors used for a region other than the image in the album including an image based on the result of analysis of the image color analyzing section, wherein the image color analyzing section includes:
- a color extraction section for extracting a plurality of colors included in the image region other than the main subject determined by the main subject determining section; and
- an appearance frequency of color calculating section for calculating the appearance frequency of the plurality of colors extracted by the color extraction section, and wherein the album color determining section includes:
- a characteristic color determining section for determining a characteristic color in the image region other than the main subject determined by the main subject determining section based on the appearance frequency of the plurality of colors calculated by the color appearance calculating section; and
- an album color selecting section for selecting a color used for the album which is used in the region other than the image in the album including the image based on the characteristic color determined by the characteristic color determining section.

* * * * *